Sept. 25, 1956  R. J. MOLYNEAUX  2,764,661
ELECTRIC HEATING APPARATUS
Filed July 26, 1954  2 Sheets-Sheet 1

INVENTOR.
Robert J. Molyneaux
BY
Smith, Olsen, Baird & Gulbrandsen,
Attys.

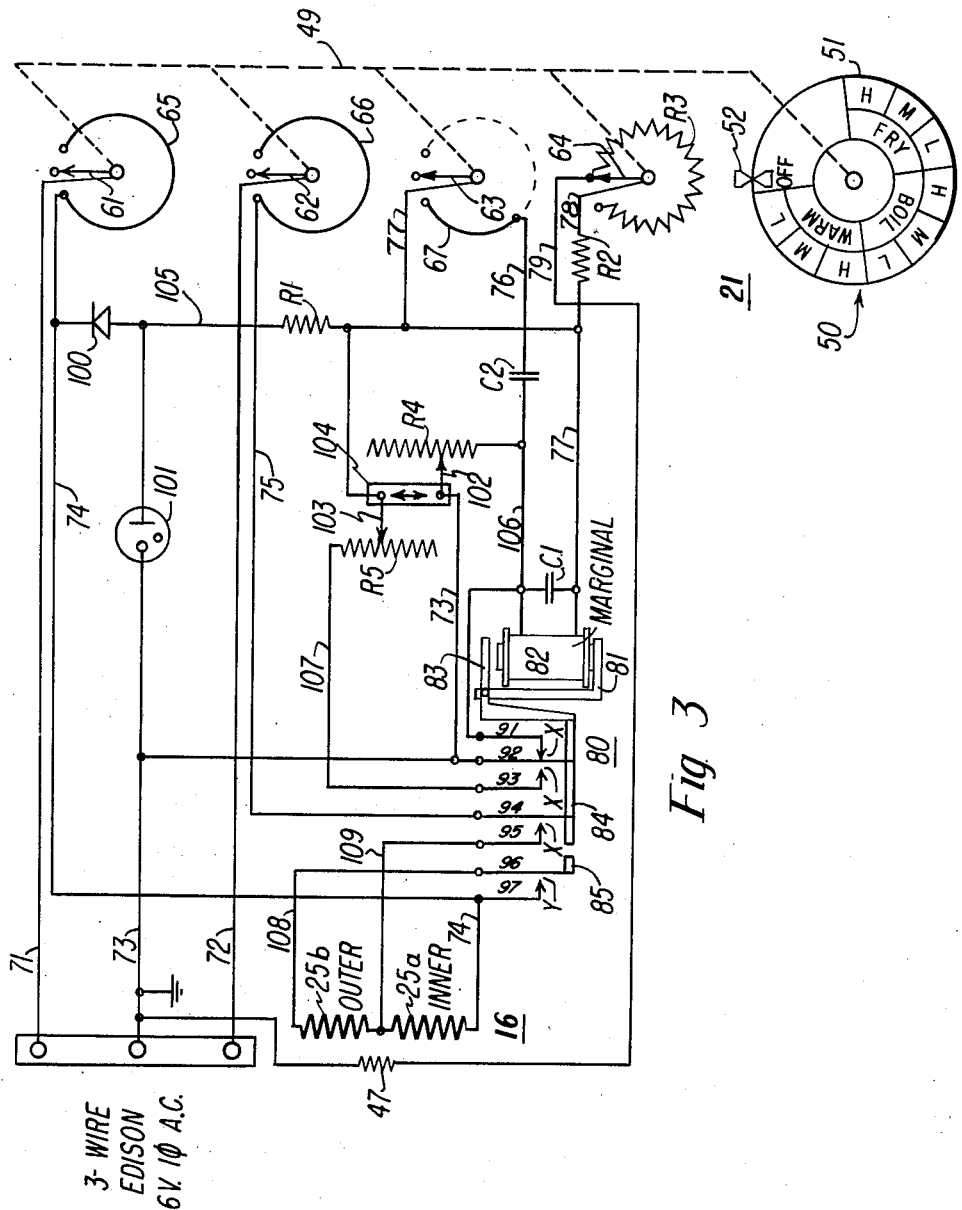

United States Patent Office 2,764,661
Patented Sept. 25, 1956

2,764,661

ELECTRIC HEATING APPARATUS

Robert J. Molyneaux, Chicago, Ill., assignor to General Electric Company, a corporation of New York Application July 26, 1954, Serial No. 445,859

17 Claims. (Cl. 219—20)

The present invention relates to electric control systems, and more particularly to improved automatic temperature control systems for electric heating apparatus, and specifically to such automatic temperature control systems for cooking vessels heated by electric heating units or hotplates and of the character disclosed in the copending application of Robert J. Molyneaux and Kenneth H. Walkoe, Serial No. 375,753, filed August 21, 1953.

It is the general object of the present invention to provide an electric control system that comprises a circuit network of simple and economical connection and arrangement involving a minimum number of individual conventional elements.

Another object of the invention is to provide an automatic temperature control system for cooking vessels heated by an electric hotplate, and incorporating an improved circuit network that requires no thermionic tubes or other elements which must be replaced during the normal life of the system.

A further object of the invention is to provide an automatic temperature control system of the character noted that includes a power switch for selectively controlling the heating of the hotplate, an electromagnetic relay for selectively controlling the operation of the power switch, a temperature sensing element controlled by the temperature of the cooking vessel for selectively controlling the operation of the relay, and a circuit network also controlled by the relay for preventing the control of the relay from upsetting or varying the control of the temperature sensing element by the cooking vessel.

Further features of the invention pertain to the particular arrangement of the elements of the electric heating apparatus and of the associated control network, whereby the above-outlined and additional operating features thereof are attained.

Figure 1:
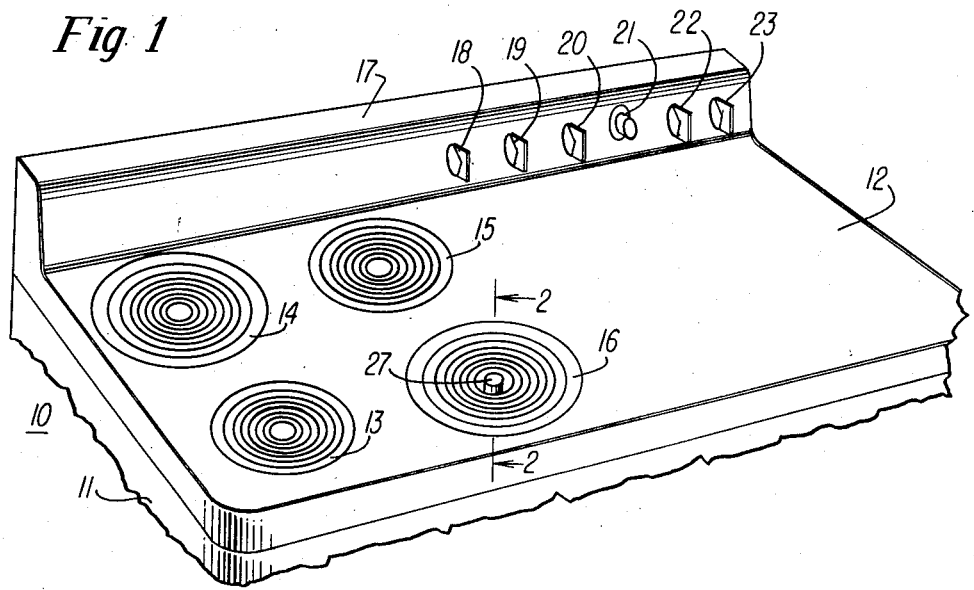
Figure 2:
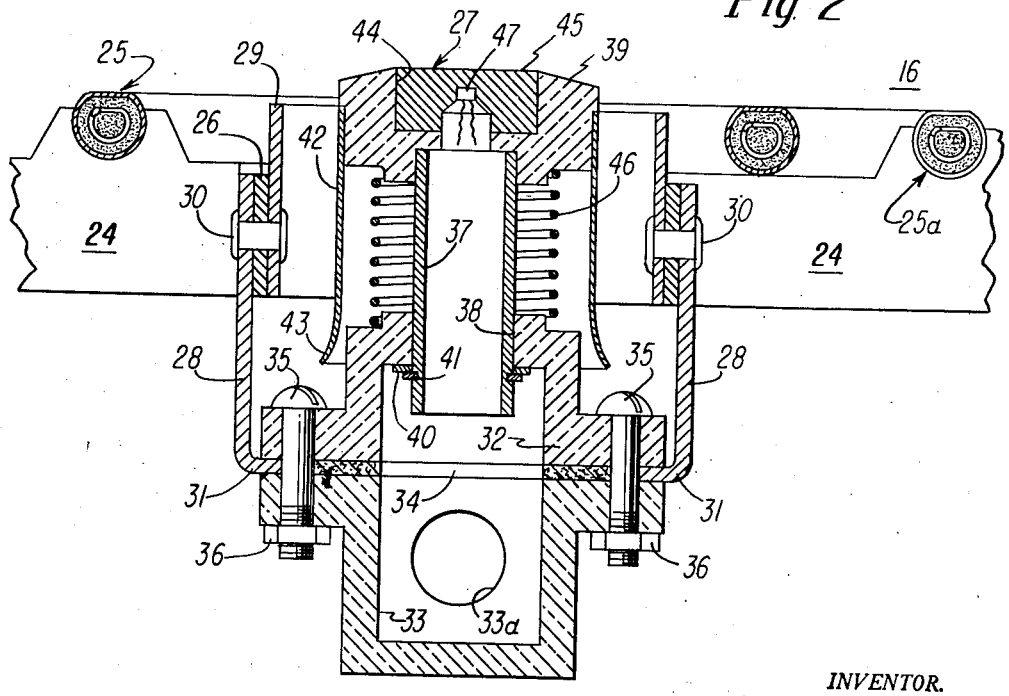

The invention, both as to its organization and method of operation, together with further objects and advantages thereof, will best be understood by reference to the following specification taken in connection with the accompanying drawings, in which:

Figure 1 is a fragmentary front perspective view of the upper portion of an electric range incorporating electric heating apparatus embodying the present invention;

Fig. 2 is a greatly enlarged fragmentary vertical sectional view of one of the electric heating units or hotplates incorporated in the electric range, taken in the direction of the arrows along the line 2—2 in Fig. 1, illustrating the construction of the temperature sensing unit incorporated therein and forming a part of the electric control circuit; and Fig. 3 is a diagram of the electric control circuit for the electric heating unit or hotplate and incorporating the temperature sensing unit, both shown in Fig. 2.

Referring now to Fig. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16 arranged in spaced-apart relation in a substantially rectangular pattern on the left-hand side thereof. The body 11 houses an oven, not shown, in the right-hand portion thereof, and a compartment, not shown, in the left-hand portion thereof, the oven and the compartment being respectively provided with front doors, not shown. The cooking top 12 carries an upstanding backsplash 17 adjacent to the rear thereof, that, in turn, carries a plurality of surface heating unit selector switches 18, 19 and 20, a special control switch 21, an oven selector switch 22, and an oven regulator or thermostatic switch 23, the elements 18 to 23, inclusive, being arranged in a row on the right-hand side of the backsplash 17. The selector switches 18, 19 and 20 respectively correspond to the surface heating units 13, 14 and 15 of conventional construction and are respectively included in the electric heating circuits thereof; while the special control switch 21 corresponds to the surface heating unit 16 of special construction and is included in the electric heating circuit thereof. Each of the surface heating unit selector switches 18, 19 and 20 and the oven selector switch 22, as well as the thermostatic switch 23, are of conventional construction and arrangement.

The cooking top 12 has a plurality of openings therein that respectively receive the surface heating units 13, etc.; and each of the surface heating units 13, 14 and 15 may be fundamentally of the construction disclosed in U. S. Patent No. 2,565,443, granted on August 21, 1951, to Oliver G. Vogel and Francis E. Kirk; while the surface heating unit 16 is of the special construction disclosed in the previously-mentioned Molyneaux and Walkoe application.

The surface heating unit 16 is of the hotplate type and is mounted for pivotal movements in the associated opening provided in the cooking top 12 by mechanism, not shown, that is preferably of the construction of that disclosed in U. S. Patent No. 2,565,432, granted on August 21, 1951, to Francis E. Kirk. More particularly, referring to Fig. 2, the heating unit 16 comprises a spider 24 carrying a heating element 25 including respective inner and outer sections 25a and 25b, only a portion of the inner section 25a being illustrated. The heating element 25 is generally in the form of a helical coil or spiral, the turns of which are arranged in radially spaced-apart relation; and preferably, the heating element 25 is of the metal sheath-helical resistance conductor type disclosed in U. S. Patent No. 1,367,341, granted on February 1, 1921, to Charles C. Abbott. The spider 24 comprises a substantially centrally disposed upstanding ring 26, the coils of the heating element 25 being selectively staked to the arms of the spider 24 in the general manner disclosed in the Vogel and Kirk patent mentioned. The top surfaces of the coils of the heating element 25 are flattened to define a substantially horizontal plane adapted to engage and to support the bottom wall of a cooking vessel, or the like, not shown.

The hotplate 16 carries a temperature sensing unit 27 within the central ring 26 that is adapted to engage the bottom wall of the cooking vessel, or the like, supported upon the heating element 25; and more particularly, a pair of opposed depending arms 28 are arranged exteriorly of the central ring 26, and an upstanding tubular heat shield 29 is arranged interiorly of the central ring 26, the arms 28 and the heat shield 29 being retained in place by an opposed pair of rivets 30. The arms 28 terminate in inwardly directed flanges 31 disposed below the central ring 26 that carry upper and lower substantially cup-shaped insulating housings 32 and 33 formed of lava, or the like. The upper housing 32 is arranged in inverted position and constitutes a supporting base, the housings 32 and 33 being retained in place upon the flanges 31, with an asbestos ring 34 clamped therebetween, by removable screws 35 provided with cooperating nuts 36. An upstanding tubular member 37 is slidably mounted in a cooperating opening 38 provided in the top of the base 32, the upper end of the tubular member 37 carrying an insulating ring 39 formed of lava, or the like, and arranged within the heat baffle 29 in spaced relation with respect thereto. The tubular member 37 is retained in place by an arrangement including a surrounding washer 40 and a cooperating lock ring 41 carried on the lower end thereof and cooperating with the top of the base 32 adjacent to the opening 38. The ring 39, in turn, carries a depending tubular heat shield 42 of general skirt-like structure that is spaced inwardly with respect to the cooperating heat shield 29, the extreme lower end of the heat shield 42 being outwardly flared, as indicated at 43, so that it covers the top of the base 32. A central cavity 44 is formed in the top of the ring 39 and carries a sensing button 45 formed of aluminum, or the like.

In the arrangement, the heat shields 29 and 42, as well as the tubular member 37, are preferably formed of stainless steel, or other bright and reflective material; while the sensing button 45 is formed of aluminum, or the like, as previously noted, so that it constitutes a good heat conductor capable of following closely the temperature of the bottom wall of a cooking vessel, or the like, supported by the heating element 25. The tubular member 37, the ring 39, the heat shield 42 and the sensing button 45 are movable as a unit with respect to the base 32, by virtue of the arrangement of a coil spring 46 surrounding the tubular member 37 and disposed between the top of the base 32 and the bottom of the ring 39. More particularly, the coil spring 46 normally biases the parts 37, 39, 42 and 45 upwardly with respect to the base 32; whereby the top surface of the sensing button 45 is normally disposed slightly above the substantially horizontal plane of the flattened top surface of the heating element 25. However, when a cooking vessel, or the like, is placed upon the heating element 25, the bottom wall thereof engages the top surface of the sensing button 45 moving the elements 37, 39, 42 and 45 downwardly with respect to the base 32 against the bias of the coil spring 46; whereby the top surface of the sensing button 45 is urged in good thermal contact with the bottom wall of the supported cooking vessel by the coil spring 46.

A temperature sensing resistor 47 is arranged in a cooperating centrally disposed cavity formed in the lower surface of the sensing button 45. The temperature sensing resistor 47 is, of course, movable with the sensing button 45 and is arranged in good heat relation therewith, for a purpose more fully explained hereinafter, the temperature sensing resistor 47 being included in an external electric circuit, described more fully hereinafter, the connecting wiring elements extending through the tubular member 37 and through a hole 33a provided in the housing 33. Since the wiring mentioned is subject to a rather high temperature, it is preferably formed of silver, or the like, and is preferably covered with an insulating material capable of withstanding the relatively high temperature mentioned, such, for example, as polytetrafluoroethylene, sold as "Teflon." The sensing resistor 47 is formed of material having a high negative temperature coefficient of resistance, such, for example, as the ceramic-like material consisting of sintered aluminum oxide, and an oxide of magnesium, manganese, titanium, iron, nickel, cobalt, zinc, etc., and known as "Thermistor" material. For example, the thermistor 47 may have the exceedingly high temperature coefficient of resistance corresponding to a resistance rate change of —0.044 ohm/° C.; whereby the characteristic of the thermistor 47 may be as follows:

| Temperature (° C.): | Total resistance (ohms) |
|---|---|
| 25 | 100,000 |
| 50 | 34,000 |
| 100 | 6,000 |
| 150 | 1,700 |
| 200 | 580 |

Referring now to Fig. 3, the manually operable control switch 21 carried by the backsplash 17 and individually associated with the hotplate 16 comprises a rotatably mounted operating shaft 49 carrying a manual dial or knob 50 on the outer end thereof and provided with indicia 51 cooperating with an index marker 52 carried by the backsplash 17. More particularly, the control switch 21 comprises off, warm, boil and fry positions that correspond to respective portions of the indicia 51 carried by the manual dial 50 and cooperating with the index marker 52, each of the warm, boil and fry ranges includes low, medium and high subsections. In the arrangement, the indicia 51 carried by the manual dial 50 correspond to temperatures of a cooking vessel supported by the hotplate 16; whereby the warm range may correspond to the temperature range 120°–220° F.; the boil range may correspond to the temperature range 220°–320° F.; and the fry range may correspond to the temperature range 320°–420° F. Accordingly, the warm, boil and fry ranges respectively correspond to meat-cooking, candy-making and deep fat-frying cooking operations. Further, the rotatable shaft 49 of the control switch 21 carries four wipers 61, 62, 63 and 64 that are simultaneously adjusted as the manual knob 50 is rotated. The wipers 61, 62 and 63 respectively comprise portions of three switches respectively including cooperating conducting segments 65, 66 and 67; and the wiper 64 comprises a portion of a resistance bridge including a main control resistor R3. Also the circuit network comprises a three-wire Edison source of power supply of 236 volts, single-phase, A. C., including two outside lines 71 and 72 and a grounded neutral line 73, the outside lines 71 and 72 being respectively connected to the wipers 61 and 62. The conducting segments 65, 66 and 67 respectively terminate three conductors 74, 75 and 76; the wipers 63 and 64 respectively terminate two conductors 77 and 78; one terminal of the main control resistor R3 terminates a conductor 79; and the other terminal of the resistor R3 is open. In the arrangement, when the manual dial 50 occupies its off position, the wipers 61, 62 and 63 respectively disengage the cooperating conducting segments 65, 66 and 67, and the wiper 64 engages the end of the cooperating resistor R3 terminating the conductor 79. When the manual dial 50 is rotated in the clockwise direction out of its off position about 10° into the lower subsection of its warm range, the wipers 61 and 62 respectively engage the conducting segments 65 and 66, the wiper 63 remains in disengagement with the conducting segment 67, and the wiper 64 inserts a small portion of the main control resistor R3 between the conductors 78 and 79. As the manual dial 50 is rotated further in the clockwise direction through its warm range and its boil range, the wipers 61 and 62 remain in engagement with the respective conducting segments 65 and 66, the wiper 63 remains in disengagement with the conducting segment 67, and the wiper 64 progressively inserts the main control resistor R3 between the conductors 78 and 79. When the manual dial 50 is rotated further in the clockwise direction into its fry range, the wiper 61 and 62 remain in engagement with the respective conducting segments 65 and 66, the wiper 63 engages the conducting segment 67, and the wiper 64 inserts an additional portion of the main control resistor R3 between the conductors 78 and 79.

Also, the circuit network comprises an electromagnetic relay 80 of the marginal type provided with a field structure 81 carrying an operating winding 82 and provided with a pivotally mounted armature 83 that cooperates with a number of switch springs 91 to 97, inclusive. In the arrangement, the movable switch spring 92 commonly cooperates with the rear switch spring 91 and the front switch spring 93, while the movable switch springs 94 and 96 respectively cooperate with the front switch springs 95 and 97. Moreover, the movable switch springs 92 and 94 are operated by the armature 83 on an "x" basis, while the movable switch spring 96 is operated by the armature 83 on a "Y" basis. In other words, when the armature 83 is operated, the movable switch springs 92 and 94 complete their operating movements prior to the operating movement of the movable switch spring 96; whereas when the armature 83 is restored, the movable switch spring 96 completes its restoring movement prior to the restoring movements of the movable switch springs 92 and 94; which arrangement is achieved by the construction of the associated insulating operators 84 and 85 operatively associated with the armature 83.

Further, the circuit network comprises a dry plate rectifier 100, preferably of the selenium type, an associated load resistor R1, a current limiting resistor R2, two auxiliary control resistors R4 and R5, a gaseous discharge tube 101 of the glow discharge type, and two capacitors C1 and C2. In the arrangement, the auxiliary control resistors R4 and R5 are respectively provided with associated wipers 102 and 103 that are commonly mounted upon an associated insulating slide 104 so that when the slide 104 is moved in one direction an increased portion of the resistor R4 is tapped by the associated wiper 102 and a decreased portion of the resistor R5 is tapped by the associated wiper 103, and so that when the slide 104 is moved in the opposite direction a decreased portion of the resistor R4 is tapped by the associated wiper 102 and an increased portion of the resistor R5 is tapped by the associated wiper 103. In other words, the wipers 102 and 103 are simultaneously adjusted by the movements of the slide 104 to effect opposite controls with respect to the individually associated resistors R4 and R5.

In the circuit network, the rectifier 100 is connected between the conductor 74 and a conductor 105, and the load resistor R1 is connected between the conductor 105 and the conductor 77, whereby the conductor 105 constitutes a supply conductor and the conductor 77 constitutes a feed conductor. The glow discharge tube 101 is directly connected between the supply conductor 105 and the neutral line 73 and constitutes a voltage regulating device, as explained more fully hereinafter. The current limiting resistor R2 is connected between the feed conductor 77 and the conductor 78; the neutral line 73 is also connected to the wiper 102; and the feed conductor 77 is also connected to the wiper 103. Further, the feed conductor 77 is connected to one terminal of the winding 82 of the relay 80, the other terminal of the winding 82 being connected to a conductor 106. One terminal of the auxiliary control resistor R4 is connected to the conductor 106 and the other terminal thereof is open; while one terminal of the auxiliary control resistor R5 is connected to a conductor 107 and the other terminal thereof is open. The capacitor C1 is bridged across the feed conductor 77 and the conductor 106; while the capacitor C2 is bridged across the conductors 76 and 106.

The inner and outer sections 25a and 25b of the heating element 25 are connected in series relation, as previously noted, one terminal of the inner section 25a being connected to the conductor 74, one terminal of the outer section 25b being connected to a conductor 108, and the common terminal between the sections 25a and 25b being connected to a conductor 109. The switch spring 92 terminates the neutral line 73; and the switch springs 91, 93, 94, 95, 96 and 97 respectively terminate the conductors 106, 107, 75, 109, 108 and 74. Finally, the sensing resistor or thermistor 47 is connected between the conductor 79 and the neutral line 73, whereby the neutral line 73 also constitutes a feed conductor.

In the circuit network, the characteristic values of certain of the elements may be as follows:

| | | |
|---|---|---|
| R1 | ohms | 1,800 |
| R2 | do | 40,000 |
| R3 | do | 0–5,000 |
| R4 | do | 0–10,000 |
| R5 | do | 0–4,800 |
| C1 | microfarads | 25 |
| C2 | do | 20 |

The pick-up current of the winding 82 of the marginal relay 80 may be about 10 milliamperes D. C. and the drop-out current of the winding 82 may be about 6 milliamperes D. C.; and the selenium rectifier 100 may be rated at 117 volts A. C., 60 cycles, 30 milliamperes D. C.

Considering now the operation of the circuit network, when the control switch 21 occupies its normal off position, the wipers 61 and 62 disengage the respective conducting segments 65 and 66, deenergizing all of the elements of the circuit network so that the relay 80 normally occupies its restored position bringing about the deenergization of the inner and outer sections 25a and 25b of the heating element 25; and of course, the glow discharge tube 101 is extinguished since no current is conducted through the rectifier 100 and no voltage appears upon the supply conductor 105.

Now assuming that the cook wishes to carry out a warm cooking operation upon the hotplate 16 and that the heating element 25 thereof is cool, the cook places the cooking vessel and its contents in its supported position upon the top surface of the heating element 25, whereby the bottom wall of the cooking vessel engages the sensing button 45 and moves the sensing unit 27 into its depressed position so that the sensing button 45 is in good thermal contact with the bottom of the cooking vessel. At this time, the thermistor 47 is cool so that it has the exceedingly high resistance previously noted. Finally, the cook rotates the manual dial 56 in the clockwise direction from its off position into its warm position, whereby the wiper 61 engages the conducting segment 65 so as to complete a circuit for operating the rectifier 100 and to effect operation of the glow discharge tube 101; this circuit extending from the line conductor 71 via the wiper 61, the conducting segment 65, the conductor 74 and the rectifier 100 to the supply conductor 105, and from the supply conductor 105 via the glow discharge tube 101 to the neutral line 73, whereby the glow discharge tube 101 operates to regulate the half wave rectified voltage appearing upon the supply conductor 105. At this time, a path may be traced from the supply conductor 105 via the load resistor R1 to the feed conductor 77; a first circuit for energizing the winding 82 of the relay 80 may be traced from the feed conductor 77 via the conductor 106, the contacts between the switch springs 91 and 92 to the neutral line 73; and a series bridge circuit may be traced from the feed conductor 77 via the current limiting resistor R2, the conductor 78, the wiper 64, a portion of the main control resistor R3, the conductor 79 and the thermistor 47 to the neutral line 73. Accordingly, at this time, the winding 82 of the relay 80 is energized causing the latter relay to operate so that its armature 83 is actuated. More particularly, the movable switch spring 92 disengages the stationary switch spring 91 opening a normally closed short-circuit between the conductors 106 and 73 around the auxiliary control resistor R4; whereby the resistor R4 is inserted in series relation with the winding 82 between the feed conductor 77 and the neutral line 73, for a purpose more fully explained hereinafter. Also, the movable switch spring 92 engages the stationary switch spring 93 completing a circuit for connecting the auxiliary control resistor R5 between the feed conductor 77 and the neutral line 73. Further, the movable switch spring 94 engages the stationary switch spring 95 completing a circuit for energizing the inner section 25a of the heating element 25 across the outside lines 71 and 72; and then the movable switch spring 96 engages the stationary switch spring 97 completing a circuit for energizing the outer section 25b of the heating element 25 across the outside lines 71 and 72. Thus at this time, the inner and outer sections 25a and 25b of the heating element 25 are energized in parallel relation across the outside lines 71 and 72 of the three-wire Edison source effecting heating of the heating element 25 at a high rate and the consequent heating of the supported cooking vessel and the resulting heating of the thermistor 47 arranged in good heat exchange relation with the bottom wall of the supported cooking vessel. At this time, when the thermistor 47 is cool, the above-traced series bridge circuit, including the current limiting resistor R2, the main control resistor R3 and the thermistor 47, has an exceedingly high composite resistance due to the exceedingly high resistance of the thermistor 47, as previously explained, whereby an exceedingly small current traverses this series bridge circuit, resulting in the passage of an exceedingly small load current through the load resistor R1, as a result of the current traversing the series bridge circuit, whereby the voltage upon the feed conductor 77 is quite high. In passing, it is noted that the capacitor C1 bridged across the winding 82 of the relay 80 also serves as a filter capacitor minimizing the A. C. ripple upon the D. C. voltage appearing between the feed conductor 77 and the grounded neutral line 73.

Initially, the winding 82 of the relay 80 was energized directly between the feed conductor 77 and the neutral line 73 thereby insuring a quick pickup or operation thereof; however, incident to operation of the relay 80 the auxiliary control resistor R4 was inserted in series relation with the energizing circuit for the operating winding 82 so as to facilitate subsequently the restoration of the relay 80 in the event of a reduction in the voltage applied to the feed conductor 77. Moreover, incident to operation of the relay 80, the auxiliary control resistor R5 was bridged between the feed conductor 77 and the neutral line 73 in order to compensate the network for the effective change in the resistance of the circuit for energizing the winding 82 of the relay 80 as a consequence of the operation of the relay 80 from its restored position into its operated position. This compensation of the circuit network insures that the change of position of the relay 80 from its restored position into its operated position imposes no different ultimate load upon the feed conductor 77 and consequently upon the load resistor R1, whereby the load current traversing the load resistor R1 is substantially the same when the relay 80 occupies either its restored position or its operated position. In order to insure this result, the equivalent resistance between the feed conductor 77 and the neutral line 73 should be the same when the relay 80 occupies its respective restored and operated positions; whereby $$R \text{ (equiv)} = R_{82} = \frac{(R_{82} + R_4) R_5}{R_{82} + R_4 + R_5}$$

Wherein:

$R_{82}$ = resistance of the winding 82
$R_4$ = resistance of the resistor R4
$R_5$ = resistance of the resistor R5

As the temperature of the heating element 25 rises, with the passage of time, the temperature of the cooking vessel and its contents rise; whereby the sensing button 45 is heated through the bottom wall of the cooking vessel to raise the temperature thereof so as to bring about an increase in the temperature of the thermistor 47; whereby the resistance of the thermistor 47 is decreased effecting a corresponding decrease in the composite resistance of the series bridge circuit, also including the limiting resistor R2 and the main control resistor R3. As the composite resistance of this series bridge circuit is thus decreased, the current traversing the same is correspondingly increased so that the current traversing the load resistor R1 is correspondingly increased bringing about an increase in the voltage drop across the load resistor R1 and a consequent decrease in the voltage appearing between the feed conductor 77 and the neutral line 73. As the voltage thus applied to the feed conductor 77 is reduced, the current traversing the operating winding 82 and the auxiliary control resistor R4 in series relation is proportionately decreased, whereby the reduction in the current traversing the operating winding 82 of the relay 80 tends to bring about restoration of the relay 80. As the temperature of the cooking vessel is further increased, the above-described actions are accentuated, whereby ultimately the resistance of the thermistor 47 is reduced sufficiently that the current traversing the series bridge circuit is adequate to produce a voltage reduction upon the feed conductor 77 so that the current traversing the winding 82 is insufficient to retain the relay 80 in its operated position, so that the relay 80 restores.

More particularly, the armature 83 of the relay 80 is returned from its operated position back into its restored position so that the movable switch spring 96 first disengages the stationary switch spring 97 interrupting the circuit for energizing the outer section 25b of the heating element 25; thereafter, the movable switch springs 92 and 94 respectively disengage the stationary switch springs 93 and 95 and the movable switch spring 92 reengages the stationary switch spring 91. The disengagement of the switch springs 94 and 95 interrupts the circuit for energizing the inner section 25a of the heating element 25; the disengagement of the switch springs 92 and 93 interrupts the path for connecting the auxiliary control resistor R5 between the feed conductor 77 and the neutral line 73; and the re-engagement of the switch springs 92 and 91 again short-circuits the auxiliary control resistor R4 recompleting the original direct circuit for energizing the winding 82 between the feed conductor 77 and the neutral line 73. At this time, it may be assumed that the voltage applied to the feed conductor 77 as a consequence of the load imposed upon the load resistor R1 by the series bridge circuit is inadequate to reoperate the relay 80, although the removal of the auxiliary control resistor R4 from the circuit for energizing the winding 82 facilitates further operation of the relay 80 from its now restored position back into its operated position. Again, it is noted that the interruption of this circuit for connecting the auxiliary control resistor R5 across the feed conductor 77 and the neutral line 73, together with the interruption of the series circuit for energizing the winding 82 through the auxiliary control resistor R4, along with the recompletion of the direct circuit for energizing the winding 82 between the feed conductor 77 and the neutral line 73, does not change the effective resistance of the network due to the substantially constant equivalent resistance thereof, as explained above, when the relay 80 occupies either its operated position or its restored position; whereby the change of position of the relay 80 does not in any way affect the control of the series bridge circuit, including the thermistor 47, that is governed by the temperature of the bottom wall of the cooking vessel supported by the heating element 25.

Subsequently, the temperature of the heating element 25 subsides effecting a reduction in the temperature of the cooking vessel and its contents so that the temperature of the thermistor 47 is reduced bringing about an increase in the resistance thereof with a consequent decrease in the current traversing the series bridge circuit, whereby the voltage applied to the feed conductor 77 rises as a consequence of the reduction in the voltage drop across the load resistor R1, so that an increased voltage is applied across the operating winding 82 of the relay 80. As the temperature of the cooling vessel is further reduced, the above-described actions are accentuated, whereby the voltage ultimately appearing upon the feed conductor 77 is sufficient to effect reoperation of the relay 80 from its restored position back into its operated position.

In view of the foregoing description, it will be understood that the relay 80 is alternately operated and restored to effect connection and disconnection of the heating element 25 with respect to the outside lines 71 and 72 of the Edison source so as to maintain the previously set temperature of the cooking vessel that is supported by the heating element 25. In this connection, it will be understood that the composite resistance of the series bridge circuit is controlled jointly by the resistance of the thermistor 47 and by the resistance of the main control resistor R3, whereby the setting of the manual dial 50 in the warm range selectively controls the effective resistance of the main control resistor R3, and accordingly, selectively sets the temperature that is to be maintained by the circuit network. More specifically, clockwise rotation of the manual dial 50 in its warm range progressively includes additional resistance of the main control resistor R4 in the series bridge circuit, whereby the thermistor 47 must be heated to a progressively higher temperature to effect a correspondingly lower resistance thereof and a consequent equivalent resistance of the series bridge circuit. Thus, setting of the manual dial 50 in the clockwise direction is effective to increase the effective resistance of the main control resistor R3 and consequently the effective resistance of the series bridge circuit, and results in a higher temperature being maintained by the control network as governed by the thermistor 47 under the control of the temperature of the cooking vessel supported by the hotplate 16.

In conjunction with the operation and restoration of the relay 80, the action of the capacitor C1 is particularly noted. When the relay 80 occupies its restored position, the full voltage of the feed conductor 77 is applied in parallel relation to the winding 82 and to capacitor C1; whereas, when the relay 80 occupies its operated position, the auxiliary control resistor R4 is inserted in series relation with the winding 82 and consequently with the capacitor C1. Thus, the voltage applied across the capacitor C1 is higher prior to operation of the relay 80 than it is subsequent to operation of the relay 80; whereby the capacitor C1 is at least partially discharged through the winding 82 incident to operation of the relay 80. This action insures that the relay 80 remains in its operated position at least during this discharge time interval of the capacitor C1. Conversely, when the relay 80 is actuated from its operated position into its restored position, the capacitor C1 is charged to a higher voltage as a result of the removal of the auxiliary control resistor R4 from the charging circuit thereof. This action insures a load upon the load resistor R1 at least during this charging time interval of the capacitor C1 so as to insure that the relay 80 remains in its restored position during this time interval. Accordingly, the arrangement of the capacitor C1 in the circuit network, as described above, prevents rapid hunting or fluttering of the relay 80 between its operated and restored positions.

Also in conjunction with the operation and restoration of the relay 80, it will be understood that the inner and outer sections 25a and 25b of the heating element 25 are progressively connected and disconnected with respect to the outside lines 71 and 72 of the Edison source, thereby minimizing arcing of the corresponding contacts between the switch springs 94—95 and 96—97.

In view of the above, it will be understood that the carrying out of boil and fry cooking operations upon the electric range 10 are substantially identical to that described in conjunction with the warm cooking operation, except that the manual dial 50 is rotated further in the clockwise direction into the corresponding boil and fry ranges thereof, whereby corresponding progressively higher temperatures are set for the action of the control network. In connection with the operation of the manual dial 50 into its fry range, it is noted that the wiper 63 engages the associated conducting segment 67 so as to bridge the capacitor C2 in parallel with the capacitor C1 across the winding 82 of the relay 80 and between the feed conductor 77 and the conductor 106. This bridging of the capacitor C2 in parallel with the capacitor C1 brings about an increase in the effective capacitance of the circuit network thereby increasing the timing constant thereof in order that the relay 80 has a tendency to remain both in its operated position and in its restored position shorter time intervals between changes in the position thereof so as to narrow the band of the overshoot and of the undershoot of the temperature of the hotplate 16.

Of course, it will be understood that at the conclusion of any cooking operation, when the manual dial 50 is returned back into its off position, the wipers 61 and 62 respectively disengage the associated conducting segments 65 and 66 effecting deenergization of all of the circuit elements and insuring that the relay 80 occupies its restored position so that the heating element 25 is disconnected from the three-wire Edison source.

In the operation of the circuit network, it will be appreciated that the glow discharge tube 101 serves as a voltage regulator tending to maintain substantially constant the rectified voltage applied between the supply conductor 105 and the neutral line 73, notwithstanding some variations in the voltage of the three-wire Edison source.

Further, it is noted that the adjustment of the slide 104, and the consequent adjustments of the auxiliary control resistors R4 and R5, normally comprises a factory or repairman's adjustment and insures that the operating range of the circuit network corresponding to and is calibrated within the range of the manual dial 50. In this connection, it will be observed that the auxiliary control resistors R4 and R5 are adjusted in opposite directions by any movement of the slide 109, as it will be appreciated from the foregoing formula that when the resistance of the resistor R4 is increased the resistance of the resistor R5 should be decreased so that the equivalent resistance of the circuit network is maintained substantially constant regardless of the operated position or the restored position of the relay 80, for the purpose previously explained.

The purpose of the current limiting resistor R2 is to prevent self-heating of the thermistor 47 by the current passing therethrough in the series bridge circuit when the main control resistor R3 is substantially cut-out of the series bridge circuit. In other words, when the main control resistor R3 is set at a minimum resistance corresponding to the lowermost subsection of the warm range of the manual dial 50, it is undesirable that the thermistor 47 should be heated as a consequence of the current passing therethrough; which undesirable possibility is prevented by the fixed inclusion of the current limiting resistor R2 in the series bridge circuit.

In view of the foregoing description of the mode of operation of the circuit network, it will be understood that the thermal controls that are derived by the thermistor 47 from the cooking vessel supported by the hotplate 16 are translated thereby into electrical controls in the series bridge circuit in order selectively to establish the voltage applied to the feed conductor 77 and consequently the position of the relay 80 so that the heating element 25 is selectively connected and disconnected with respect to the three-wire Edison source for the purpose of maintaining the preset temperature. In the arrangement, the range of the thermistor 47 may be selectively established by selectively setting the effective resistance of the main control resistor R3 which may be accomplished by corresponding manipulation of the manual dial 50. Accordingly, the heating element 25 is energized cyclically effecting modulation of the heating of the hotplate 16 and thereby maintaining the preset cooking temperature of the supported cooking vessel and its contents.

Accordingly, it is apparent that there has been provided in heating apparatus of the hotplate type, an improved circuit network for selectively establishing within a relatively wide temperature range the cooking temperature of a cooking vessel supported by the hotplate and for selectively controlling the electric power supplied to the hotplate in accordance with the desired cooking temperature thus established so as to maintain the desired cooking temperature of the cooking vessel and its contents during the cooking operation.

While there has been described what is at present considered to be the preferred embodiment of the invention, it will be understood that various modifications may be made therein, and it is intended to cover in the appended claims all such modifications that fall within the true spirit and scope of the invention.

What is claimed is:

1. In electric heating apparatus including an electric heating unit adapted to support a vessel to be heated, a source of electric power, and a power switch operative between an open position disconnecting said heating unit from said source and a closed position connecting said heating unit to said source; the combination comprising a temperature sensing resistor operatively associated with a vessel supported by said heating unit and having a high temperature coefficient of resistance so that the resistance of said temperature sensing resistor is selectively variable in accordance with the temperature of the supported vessel, a pair of feed conductors, a device operated from said power source for supplying a variable voltage between said feed conductors, means governed by the resistance of said temperature sensing resistor for selectively controlling said device in order selectively to vary the voltage supplied between said feed conductors, a control switch having an off position operatively disconnecting said device from said power source and an on position operatively connecting said device to said power source, an electromagnetic actuator having a restored position actuating said power switch into its open position and an operated position actuating said power switch into its closed position, said actuator including a winding and being of the marginal type so that it is selectively actuated between its restored and operated positions in accordance with the current traversing said winding, a first circuit for connecting said winding across said feed conductors, a first control resistor, a second circuit for connecting said winding in series relation with said first control resistor across said feed conductors, a second control resistor, a third circuit for connecting said second control resistor across said feed conductors, and switching means responsive to actuation of said actuator into its restored position for completing said first circuit and for interrupting said second and third circuits and responsive to actuation of said actuator into its operated position for interrupting said first circuit and for completing said second and third circuits.

2. The electric heating apparatus combination set forth in claim 1, wherein said temperature sensing resistor consists essentially of a thermistor having a relatively high resistance when the temperature of the supported vessel is relatively low and having a relatively low resistance when the temperature of the supported vessel is relatively high.

3. The electric heating apparatus combination set forth in claim 1, wherein the resistance of said winding is substantially equal to the sum of the product of the resistance of said winding and the resistance of said second control resistor and of the product of the resistance of said first control resistor and the resistance of said second control resistor all divided by the sum of the resistance of said winding and the resistance of said first control resistor and the resistance of said second control resistor.

4. The electric heating apparatus combination set forth in claim 1, and further comprising a capacitor connected across said winding.

5. In electric heating apparatus including an electric heating unit adapted to support a vessel to be heated, a source of electric power, and a power switch operative between an open position disconnecting said heating unit from said source and a closed position connecting said heating unit to said source; the combination comprising a temperature sensing resistor operatively associated with a vessel supported by said heating unit and having a high temperature coefficient of resistance so that the resistance of said temperature sensing resistor is selectively variable in accordance with the temperature of the supported vessel, a pair of feed conductors, a device operated from said power source for supplying a variable voltage between said feed conductors, a control switch having an off position operatively disconnecting said device from said power source and a variable on position operatively connecting said device to said power source, a variable temperature setting resistor, means selectively governed by said control switch in its variable on position for selectively varying the resistance of said temperature setting resistor, means governed jointly by the resistance of said temperature sensing resistor and by the resistance of said temperature setting resistor for selectively controlling said device in order selectively to vary the voltage supplied between said feed conductors, an electromagnetic actuator having a restored position actuating said power switch into its open position and an operated position actuating said power switch into its closed position, said actuator including a winding and being of the marginal type so that it is selectively actuated between its restored and operated positions in accordance with the current traversing said winding, a first circuit for connecting said winding across said feed conductors, a first control resistor, a second circuit for connecting said winding in series relation with said first control resistor across said feed conductors, a second control resistor, a third circuit for connecting said second control resistor across said feed conductors, and switching means responsive to actuation of said actuator into its restored position for completing said first circuit and for interrupting said second and third circuits and responsive to actuation of said actuator into its operated position for interrupting said first circuit and for completing said second and third circuits.

6. The electric heating apparatus combination set forth in claim 5, and further comprising a first capacitor connected across said winding, a second capacitor, and means governed by said control switch in its variable on position for selectively connecting said second capacitor across said winding.

7. In electric heating apparatus including a two-section electric heating unit adapted to support a vessel to be heated, a source of electric power, and a power switch operative between an open position and a final closed position through an intermediate closed position, said power switch in its open position disconnecting said sections from said source and in its intermediate closed position connecting one of said sections to said source and in its final closed position connecting both of said sections to said source; the combination comprising a temperature sensing resistor operatively associated with a vessel supported by said heating unit and having a high temperature coefficient of resistance so that the resistance of said temperature sensing resistor is selectively variable in accordance with the temperature of the supported vessel, a pair of feed conductors, a device operated from said power source for supplying a variable voltage between said feed conductors, means governed by the resistance of said temperature sensing resistor for selectively controlling said device in order selectively to vary the voltage supplied between said feed conductors, a control switch having an off position operatively disconnecting said device from said power source and an on position operatively connecting said device to said power source, an electromagnetic actuator having restored and operated positions, means responsive to actuation of said actuator from its restored position into its operated position for actuating said power switch from its open position through its intermediate closed position into its final closed position and responsive to actuation of said actuator from its operated position into its restored position for actuating said power switch from its final closed position through its intermediate closed position into its open position, said actuator including a winding and being of the marginal type so that it is selectively actuated between its restored and operated positions in accordance with the current traversing said winding, a first circuit for connecting said winding across said feed conductors, a first control resistor, a second circuit for connecting said winding in series relation with said first control resistor across said feed conductors, a second control resistor, a third circuit for connecting said second control resistor across said feed conductors, and switching means responsive to actuation of said actuator into its restored position for completing said first circuit and for interrupting said second and third circuits and responsive to actuation of said actuator into its operated position for interrupting said first circuit and for completing said second and third circuits.

8. In electric heating apparatus including an electric heating unit adapted to support a vessel to be heated, a source of alternating current supply, and a power switch operative between an open position disconnecting said heating unit from said source and a closed position connecting said heating unit to said source; the combination comprising a temperature sensing resistor operatively associated with a vessel supported by said heating unit and having a high temperature coefficient of resistance so that the resistance of said temperature sensing resistor is selectively variable in accordance with the temperature of the supported vessel, a pair of feed conductors, a first circuit connecting said temperature sensing resistor across said feed conductors, a control switch having an off position operatively disconnecting said feed conductors from said source and an on position operatively connecting said feed conductors to said source, said last-mentioned connection including a rectifier and a series related load resistor, whereby the direct voltage across said feed conductors is inversely related to the current through said load resistor, an electromagnetic actuator having a restored position actuating said power switch into its open position and an operated position actuating said power switch into its closed position, said actuator including a winding and being of the marginal type so that it is selectively actuated between its restored and operated positions in accordance with the current traversing said winding, a second circuit for connecting said winding across said feed conductors, a first control resistor, a third circuit for connecting said winding in series relation with said first control resistor across said feed conductors, a second control resistor, a fourth circuit for connecting said second control resistor across said feed conductors, and switching means responsive to actuation of said actuator into its restored position for completing said second circuit and for interrupting said third and fourth circuits and responsive to actuation of said actuator into its operated position for interrupting said second circuit and for completing said third and fourth circuits.

9. An electric control system comprising a source of electric power, a pair of feed conductors, a device operated from said power source for supplying a variable voltage between said feed conductors, a first variable control resistor, means for selectively controlling the resistance of said first control resistor, means governed by the resistance of said first control resistor for selectively controlling said device in order selectively to vary the voltage supplied between said feed conductors, an electromagnetic relay including a winding and being of the marginal type so that it is selectively actuated between a restored position and an operated position in accordance with the current traversing said winding, a first circuit for connecting said winding across said feed conductors, a second control resistor, a second circuit for connecting said winding in series relation with said second control resistor across said feed conductors, a third control resistor, a third circuit for connecting said third control resistor across said feed conductors, switching means responsive to actuation of said relay into its restored position for completing said first circuit and for interrupting said second and third circuits and responsive to actuation of said relay into its operated position for interrupting said first circuit and for completing said second and third circuits, apparatus, and means selectively governed by the actuation of said relay between its restored and operated positions for selectively controlling said apparatus.

10. The electric control system set forth in claim 9, wherein the resistance of said winding is substantially equal to the sum of the product of the resistance of said winding and the resistance of said third control resistor and of the product of the resistance of said second control resistor and the resistance of said third control resistor all divided by the sum of the resistance of said winding and the resistance of said second control resistor and the resistance of said third control resistor.

11. The electric control system set forth in claim 9, and further comprising a capacitor connected across said winding.

12. The electric control system set forth in claim 9, wherein said means for selectively controlling the resistance of said first control resistor is in turn governed by the control of said apparatus.

13. An electric control system comprising a source of electric power, a pair of feed conductors, a device operated from said power source for supplying a variable voltage between said feed conductors, a first variable control resistor, means for selectively controlling the resistance of said first control resistor, a second control resistor, first manual means for selectively controlling the resistance of said second control resistor, means governed jointly by the resistance of said first control resistor and by the resistance of said second control resistor for selectively controlling said device in order selectively to vary the voltage supplied between said feed conductors, an electromagnetic relay including a winding and being of the marginal type so that it is selectively actuated between a restored position and an operated position in accordance with the current traversing said winding, a first circuit for connecting said winding across said feed conductors, a third variable control resistor, a second circuit for connecting said winding in series relation with said third control resistor across said feed conductors, a fourth variable control resistor, a third circuit for connecting said fourth control resistor across said feed conductors, switching means responsive to actuation of said relay into its restored position for completing said first circuit and for interrupting said second and third circuits and responsive to actuation of said relay into its operated position for interrupting said first circuit and for completing said second and third circuits, apparatus, means selectively governed by the actuation of said relay between its restored and operated positions for selectively controlling said apparatus, and second manual means for selectively setting simultaneously the resistances of said third and fourth control resistors in order to set the range of actuation of said relay between its restored and operated positions.

14. The electric control system set forth in claim 13, wherein said second manual means simultaneously increases the resistance of said third control resistor and decreases the resistance of said fourth control resistor in one setting direction and simultaneously decreases the resistance of said third control resistor and increases the resistance of said fourth control resistor in the other setting direction.

15. The electric control system set forth in claim 9, and further comprising voltage regulating equipment connected across said power source so as to minimize variations in the voltage supplied from said power source to said device.

16. The electric control system set forth in claim 15, wherein said voltage regulating equipment consists essentially of a glow-discharge tube.

17. In electric heating apparatus including an electric hotplate adapted to support a vessel to be heated, a source of electric power, a power switch operative between an open position disconnecting said hotplate from said power source and a closed position connecting said hotplate to said power source, and a relay provided with a winding and having an operated position actuating said power switch into its closed position and a restored position actuating said power switch into its open position; the combination comprising a control source of voltage, a load resistor, a temperature sensing unit operatively associated with a vessel supported by said hotplate and including a first control resistor having a resistance variable in accordance with the sensed temperature of the supported vessel, a second control resistor, a manually operable control device for selectively setting the resistance of said second control resistor, a control circuit supplied from said control source and including said load resistor connected in series relation with first and second arms connected in parallel relation with each other, said first arm including said winding, said second arm including said first and second control resistors connected in series relation, whereby the voltage drop across said load resistor is selectively governed jointly by the resistances of said first and second control resistors in said second arm and in turn the voltage impressed across said winding in said first arm is selectively governed by the voltage drop across said load resistor, said relay being of the marginal type so that it is operated when an above-critical voltage is impressed across said winding and restored when a below-critical voltage is impressed across said winding, a capacitor bridged across said winding, first and second auxiliary resistors, and means responsive to operation of said relay for connecting said first and second auxiliary resistors to said first arm and responsive to restoration of said relay for disconnecting said first and second auxiliary resistors from said first arm, said first auxiliary resistor being connected to said first arm, in series relation with said winding so as to reduce the voltage impressed across said winding, said second auxiliary resistor being connected to said first arm in parallel relation with said winding and said first auxiliary resistor so as to maintain substantially fixed the overall resistance of said first arm.

References Cited in the file of this patent

UNITED STATES PATENTS

| | | |
|---|---|---|
| 2,262,206 | Scott et al. | Nov. 11, 1941 |
| 2,388,839 | Fry | Nov. 13, 1945 |
| 2,651,704 | Prior | Sept. 8, 1953 |
| 2,727,974 | Simmons | Dec. 20, 1955 |
| 2,727,975 | Molyneaux et al. | Dec. 20, 1955 |